E. M. HARBERSON.
YOKE CONSTRUCTION FOR LEAF SPRINGS.
APPLICATION FILED MAY 22, 1919.

1,353,746.   Patented Sept. 21, 1920.

INVENTOR.
EDWARD M. HARBERSON
BY
ATTORNEY.

300

UNITED STATES PATENT OFFICE.

EDWARD M. HARBERSON, OF LOS ANGELES, CALIFORNIA.

YOKE CONSTRUCTION FOR LEAF-SPRINGS.

1,353,746.　　　　　　Specification of Letters Patent.　　Patented Sept. 21, 1920.

Application filed May 22, 1919.　Serial No. 298,958.

*To all whom it may concern:*

Be it known that I, EDWARD M. HARBERSON, a citizen of the United States, residing at Los Angeles, in the county of Los Angeles and State of California, have invented new and useful Improvements in Yoke Constructions for Leaf-Springs, of which the following is a specification.

My object is to make an improved yoke construction for leaf springs, and my invention consists of the novel features herein shown, described and claimed.

Figure 1:
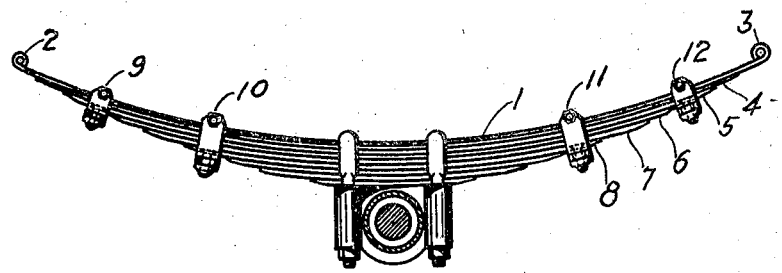
Figure 1 is a side elevation of a leaf spring provided with yokes in accordance with the principles of my invention.

In the construction of leaf springs, such as shown in Fig. 1, the upper leaf 1 has bearings 2 and 3 at its ends for connection to the load, and the lower leaves 4, 5, 6, 7, 8 and so on are primarily intended to assist in supporting the ends of the upper leaf 1 to support the load. Where such a leaf is used in a motor vehicle especially a high speed automobile, the rebound of the spring and the load is liable to break the upper leaf 1 and at any rate the upper leaf 1 will yield unduly. To overcome this objection I apply the yokes 9, 10, 11 and 12.

Figure 2:
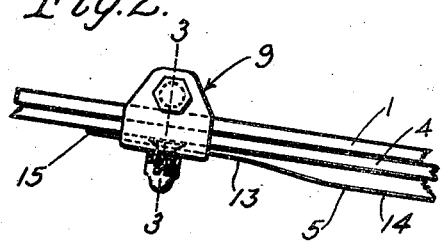
Fig. 2 is a fragmentary side elevation upon an enlarged scale and showing one yoke.
Figure 3:
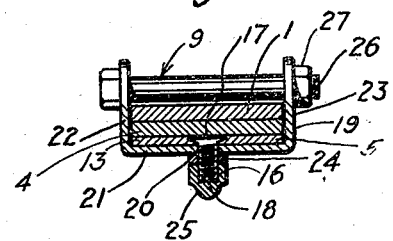
Fig. 3 is a cross section upon the line 3—3 of Fig. 2.

The yokes 9 and 12 connect the ends of the leaves 4 and 5 to the upper leaf 1 and the yokes 10 and 11 connect the ends of all the leaves above the leaf 8 to the upper leaf 1, so that when the rebound comes the strain is placed upon the lower leaves and the yokes serve as shock absorbers to prevent undue rebound and to prevent breaking of the upper leaf. The yokes 9, 10, 11 and 12 are substantially alike and in Figs. 2 and 3 I have shown the details of the yoke 9.

The extreme end portion 13 of the leaf 5 is tapered from the thick body 14 to the comparatively thin end 15. A small bolt 16 is inserted through the portion 13 near the end 15, the thin flat head 17 of the bolt being countersunk into the upper face of the leaf. A kerf 18 is formed in the end of the bolt 16 and the bolt is externally screw threaded. In a like manner a bolt is inserted through the other end of the leaf 5 and through both ends of the leaf 8, and when the leaves are assembled to make up the spring the bolts are in place and are held in place by the leaves above the bolts.

Then when desired the U-shaped clips 19 are prepared of the desired length to fit the desired places. The clips 19 have central openings 20 through the central portions 21 to fit upon the bolts 16, and said portions 22 and 23 fit against the edges of the leaves and extend above the upper leaf 1. Nuts 24 are placed upon the bolts 16 against the central portions 21, and in order to hold the bolts 16 while the nuts 24 are being screwed down tight a screw driver is applied to the kerf 18.

After the nuts 24 have been screwed up as desired the cap nuts 25 are applied to cover the ends of the bolts and to jam against the nuts 24 and hold the parts tight. The supporting bolts 26 are inserted through the upper ends of the side pieces 22 and 23 above the upper leaf 1, and nuts 27 are applied to the bolts 26, so that the bolts 26 will sustain the weight and strain when the leaf 1 rebounds.

Heretofore clips have been applied to leaf springs and the clips have been rigidly riveted to the ends of the leaves, so that when it was desired to change or remove a clip it was necessary to cut the rivet, and in repairing and making up springs for different purposes it was inconvenient to have the clips rigid upon the leaves.

It frequently happens that the end of a leaf is broken at the point where the rivet is inserted. In the use of my yokes it is an easy matter to remove the clips, take out a broken leaf, build up the spring to the desired number of leaves and put on clips to fit.

Various changes may be made without departing from the spirit of my invention as claimed.

I claim:

1. A yoke construction for leaf springs comprising the combination with an upper spring leaf and a lower spring leaf, of a clip bolt inserted downwardly through the end of the lower spring leaf and having a flat head countersunk into the upper face of the lower spring leaf, a clip having a flat portion fitting against the lower face of the lower spring leaf and having a central opening through which the clip bolt extends, side portions integral with the flat bottom portion extending upwardly past the upper spring leaf, a nut upon the clip bolt, and a supporting bolt through the ends of the clip above the upper spring leaf.

2. A yoke for leaf springs including in combination with an upper and a lower spring leaf; a clip having a bottom portion fitting against the lower face of the lower spring leaf and having side portions formed rigid with the bottom portion extending upwardly past the upper spring leaf, a bolt through the upper end of said side portions and extending across the upper spring leaf, and means for detachably connecting the bottom portion with the lower spring leaf.

In testimony whereof I have signed my name to this specification.

EDWARD M. HARBERSON.